(12) United States Patent
Pistoia et al.

(10) Patent No.: US 10,484,868 B2
(45) Date of Patent: Nov. 19, 2019

(54) CONFIGURING PRIVACY POLICIES BY FORMULATING QUESTIONS AND EVALUATING RESPONSES

(71) Applicant: International Business Machines Corporation, Armonk, NY (US)

(72) Inventors: Marco Pistoia, Amawalk, NY (US); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 15/407,887

(22) Filed: Jan. 17, 2017

(65) Prior Publication Data
US 2018/0206115 A1    Jul. 19, 2018

(51) Int. Cl.
*H04L 29/06* (2006.01)
*H04W 12/02* (2009.01)
*G06F 21/60* (2013.01)
*G06F 21/62* (2013.01)
*G06N 20/00* (2019.01)

(52) U.S. Cl.
CPC .......... *H04W 12/02* (2013.01); *G06F 21/604* (2013.01); *G06F 21/6245* (2013.01); *G06N 20/00* (2019.01); *H04L 63/20* (2013.01)

(58) Field of Classification Search
CPC ............................. H04W 12/02; G06F 21/604
See application file for complete search history.

(56) References Cited

U.S. PATENT DOCUMENTS

| | | | | |
|---|---|---|---|---|
| 2002/0188572 A1* | 12/2002 | Bleizeffer | ........... | G06F 21/6218 705/64 |
| 2004/0088295 A1* | 5/2004 | Glazer | ................. | G06F 21/604 |
| 2004/0098285 A1* | 5/2004 | Breslin | ................. | G06Q 10/10 713/193 |
| 2004/0139025 A1* | 7/2004 | Coleman | ............. | G06F 21/6254 705/51 |
| 2009/0019553 A1* | 1/2009 | Narayanaswami | | ......................... H04L 63/0428 726/28 |
| 2011/0252456 A1* | 10/2011 | Hatakeyama | ......... | G06F 21/604 726/1 |
| 2012/0136936 A1* | 5/2012 | Quintuna | ............. | G06F 21/604 709/204 |
| 2013/0326007 A1* | 12/2013 | Turner | ................ | G06F 21/6254 709/217 |

(Continued)

OTHER PUBLICATIONS

Yuan Cheng, Preserving user privacy from third-party applications in online social networks, WWW '13 Companion Proceedings of the 22nd International Conference on World Wide Web, May 2013, pp. 723-728.*

(Continued)

*Primary Examiner* — Sher A Khan
(74) *Attorney, Agent, or Firm* — Scully, Scott, Murphy & Presser, P.C.; Daniel Morris, Esq

(57) ABSTRACT

Configuring a privacy policy by identifying one or more applications that are installed on a mobile device. A set of privacy-related questions are formulated based upon the one or more identified applications. A response to the set of privacy-related questions is received from a user. One or more classified privacy instances are determined for the user from the received response. A latent, implicit privacy policy is established from the one or more classified privacy instances.

12 Claims, 4 Drawing Sheets

(56) References Cited

U.S. PATENT DOCUMENTS

| | | | | |
|---|---|---|---|---|
| 2013/0332362 | A1* | 12/2013 | Ciurea | G06Q 20/383 705/44 |
| 2014/0115712 | A1* | 4/2014 | Powell | G06F 21/6263 726/26 |
| 2015/0154676 | A1* | 6/2015 | Matousek | H04W 4/50 705/26.5 |
| 2017/0032143 | A1* | 2/2017 | Kong | H04L 63/102 |

OTHER PUBLICATIONS

Wang, Designing the Default Privacy Settingsor Facebook Applications, CSCW'14 Companion, Feb. 15-19, 2014, Baltimore, MD, USA, pp. 249-252.*

Lin, Modeling Users' Mobile App Privacy Preferences: Restoring Usability in a Sea of Permission Settings, Symposium on Usable Privacy and Security (SOUPS) 2014, Jul. 9-11, 2014, Menlo Park, CA, pp. 199-212.*

Cleary, K*: An Instance-based Learner Using an Entropic Distance Measure, Proceedings of the Twelfth International Conference on Machine Learning, Tahoe City, California, Jul. 9-12, 1995, pp. 1-14.*

Tripp et al., "A Bayesian Approach to Privacy Enforcement in Smartphones", 23rd USENIX Security Symposium, Aug. 20-24, 2014, San Diego, CA, pp. 175-190.

Holavanalli et al., "Flow Permissions for Android", Proceedings of the 28th IEEE/ACM International Conference on Automated Software Engineering, ASE'13, Silicon Valley, CA, Nov. 11-15, 2013, pp. 652-657.

Hornyack et al., ""These Aren't the Droids You're Looking for": Retrofitting Android to Protect Data from Imperious Applications", ACM, 2011, CCS'11, Proceedings of the 18th ACM Conference on Computer and Communications Security, Oct. 17-21, 2011, Chicago, IL, 13 pages.

Wetherall, et al., "Privacy Revelations for Web and Mobile Apps", HotOS'13, Proceedings of the 13th USENIX conference on Hot topics in operating systems, Napa, CA, May 9-11, 2011, pp. 1-5.

Tripp et al., "TAJ: Effective Taint Analysis of Web Applications", PLDI'09, Jun. 15-20, 2009, Dublin, Ireland, 11 pages.

Backes et al., "Automatic Discovery and Quantification of Information Leaks", SP'09, Proceedings of the 2009 30th IEEE Symposium on Security and Privacy, May 17-20, 2009, pp. 141-153.

Newsome et al., "Measuring Channel Capacity to Distinguish Undue Influence", Proceedings of the 2009 Workshop on Programming Languages and Analysis for Security, PLAS 2009, Dublin, Ireland, Jun. 15-21, 2009, pp. 1-12.

Mccamant et al., "Quantitative Information Flow as Network Flow Capacity", PLD1'08, Jun. 7-13, 2008, Tucson, AZ, pp. 1-13.

Newsome et al., "Dynamic Taint Analysis for Automatic Detection, Analysis, and Signature Generation of Exploits on Commodity Software", NDSS Symposium 2005, Feb. 3, 2005, 18 pages.

Lowe, "Quantifying Information Flow", Oxford University Computing Laboratory, Feb. 5, 2002, pp. 1-27.

Cleary et al., "K*: An Instance-based Learner Using an Entropic Distance Measure", Article—Aug. 1996, 14 pages.

* cited by examiner

CONFIGURING PRIVACY POLICIES BY FORMULATING QUESTIONS AND EVALUATING RESPONSES

FIELD

The present application relates generally to mobile applications and, more particularly, to techniques for addressing potential threats to privacy and integrity when using applications on mobile devices.

BACKGROUND

The mobile era brings with it exciting possibilities to provide applications that are customized to meet the needs and desires of specific users. Notable examples include location-based services, contextual recommendation and advertising systems, and social media features. Along with these opportunities, however, various threats to a user's integrity and privacy may arise. Mobile applications frequently demand access to private information. This information may include a phone number that identifies a specific user, an International Mobile Station Equipment Identity (IMEI) number that identifies a specific physical mobile device, social networking data, contact lists, a current geographic location for the mobile device, audio data gathered by a microphone on the mobile device, and visual information gathered by a camera on the mobile device.

While private information is often used to implement one or more core functionalities of a mobile application, this information can also be used to serve other purposes, such as advertising, analytics, and cross-application profiling. At the same time, a typical mobile phone user is unable to distinguish legitimate, intended usage of their private information from illegitimate and unintended scenarios. An illustrative example of an illegitimate and unintended scenario would be an application causing the mobile device to transmit its IMEI number to a remote advertising website to create a persistent profile of the user.

Existing platforms provide limited protection against privacy threats. Both the Android™ and the iOS™ platforms mediate access to private information via a permission model. Each of a plurality of respective permissions is mapped to a corresponding designated resource, and each permission holds for all application behaviors and attempted resource accesses. In Android™, permissions are given or denied at installation time. In iOS™, permissions are granted or revoked based upon first access to the corresponding designated resource. Hence, neither of these platforms are able to disambiguate legitimate from illegitimate or unintended usage of a resource once an application is granted a corresponding permission.

The existing shortcomings of mobile platforms in ensuring user privacy have led to a surge of research in connection with real-time privacy monitoring. One foundational technique in this research is information flow tracking, which may be provided in the form of taint analysis. Private data, obtained via privacy sources, is labeled with a taint tag denoting its source. The tag is then propagated along dataflow paths within the code of the application. Any such path that ends in a data release point or privacy sink leads to triggering of a leakage alarm. For example, consider a first statement such as TelephonyManager.getSubscriberId( ), which reads an International Mobile Subscriber identity (IMSI) number of the mobile device. A second statement, WebView.loadUrl( . . . ), which sends out an HTTP request, would trigger the leakage alarm.

The taint analysis approach performs information leakage alarm judgments using Boolean reachability queries. Use of these queries can lead to false alarm reporting. Consider the flowchart of FIG. 1 which sets forth an illustrative code fragment from an internal Android™ library. The operational sequence commences at block 101 where an IMSI number of a mobile device is read, for example, using an instruction "String mImsi= . . . ". Next, at block 103, a test is performed to ascertain whether or not the IMSI number is valid based upon a number or quantity of digits that the IMSI number includes. A valid IMSI number should be greater than or equal to six digits, but less than or equal to fifteen digits. This test may be performed using an instruction "if (mImsi=null && (MImsi.length( )<6 jj mImsi.length( )>15))." When the number is invalid, the operational sequence progresses to block 105 where the IMSI number read at block 101 is written to an error log, for example, using an instruction "{log e("invalid IMSI"+mImsi); mImsi=null;}. The affirmative branch from block 103 leads to block 107 where the first six digits of the IMSI number read at block 101 are written to a standard log while masking away a nine-digit suffix of the IMSI number as "x" characters. Block 107 may be performed using an instruction "log ("IMSI: "+mImsi.substring(0,6)+"xxxxxxxxx"). Thus, the step of block 107 may be regarded as a data sink step. However, data flow into the standard log is not a privacy problem because the first six digits of the IMSI number merely convey model and origin information. But existing taint analysis procedures are unable to exercise the necessary discrimination to determine whether or not the step of block 107 constitutes a security risk.

Quantitative extensions of the taint analysis procedure have been proposed to address the foregoing limitation. One example is a quantitative information-flow tracking system developed by McCamant and Ernst which quantifies a flow of secret or private information by dynamically tracking taint labels at the bit level. See, for example, "Quantitative Information-Flow Tracking for C and Related Languages" by Stephen McCamant and Michael D. Ernst, *MIT Computer Science and Artificial Intelligence Laboratory Technical Report* MIT-CSAIL-TR-2006-076, Cambridge, Mass., Nov. 17, 2006. Other approaches are based upon distinguishing between secrets, determining a rate of data transmission, or assessing influences of input values on output values. However, these approaches are tailored for offline analysis and are not adaptable to meet the performance requirements of real-time monitoring solutions due to the high complexity of their underlying algorithms. For example, the flow-tracking system of McCamant and Ernst needs to analyze a workload for over an hour before a report on the workload can be generated.

Yet another approach is to cast privacy judgments into a Bayesian reasoning framework. Bayesian reasoning is based upon statistical methods that assign probabilities or distributions to events (as rain tomorrow) or parameters (as a population mean) based on experience or best guesses before experimentation and data collection. These probabilities and distributions are then revised after obtaining experimental data. Pursuant to this approach, data leakage is formulated as a classification problem. This formulation generalizes the source/sink reachability judgment enforced by standard information flow analysis, permitting richer and more relaxed judgments in the form of statistical classification. One may observe that reasoning about information release is fuzzy in nature. While there are clear examples of legitimate versus illegitimate information release, there are also a number of less obvious cases. Consider, for example, a variation on the IMSI number used in FIG. 1 with a ten-digit rather than a six-digit prefix. A statistical approach, accounting for multiple factors and based on rich data sets, may be better equipped to deal with such subtleties.

Even though statistical approaches provide some advantageous features, these approaches still lack the ability to customize or specialize reports in accordance with the specific needs of users or groups of users. Different users may have different preferences with regard to privacy. As an example, some users may prefer to disclose their exact addresses and profile information in exchange for high-quality, highly relevant contextual ad content, as perhaps they are fond of shopping. However, other users may prefer to sacrifice ad quality and relevance in return for more privacy. There is no general recipe for enforcing privacy, and so accounting for fuzziness statistically is necessary yet insufficient. Thus, there exists a need to overcome at least one of the preceding deficiencies and limitations of the related art.

SUMMARY

The following summary is merely intended to be exemplary. The summary is not intended to limit the scope of the claims.

A method for configuring a privacy policy, in one aspect, may comprise identifying one or more applications that are installed on a mobile device, formulating a set of privacy-related questions based upon the one or more identified applications, receiving a response from a user to the set of privacy-related questions, determining one or more classified privacy instances for the user from the received response, and establishing a latent, implicit privacy policy from the one or more classified privacy instances.

The method for configuring a privacy policy, in a further aspect, may comprise receiving a new privacy instance for classification. The latent, implicit privacy policy is established using a machine learning classification procedure. A K-star clustering-based classification is performed by defining a metric space such that the new privacy instance is projected into the metric space. A calculation is performed to determine a proximity of the new privacy instance to each of the one or more classified privacy instances for the user. The new privacy instance is classified as one of legitimate or illegitimate, based on the proximity of the new privacy instance to each of the one or more classified privacy instances. The proximity calculation may be performed using a natural distance metric. The natural distance metric may consider any of a data category related to the new privacy instance, or an intensity level of the new privacy instance with respect to a normalized average intensity level of data that the user is willing to release based upon the received response.

A computer program product, in another aspect, may comprise a non-transient computer-readable storage medium having a computer-readable program stored therein, wherein the computer-readable program, when executed, causes a computer to perform a method for configuring a privacy policy, the method comprising identifying one or more applications that are installed on a mobile device, formulating a set of privacy-related questions based upon the one or more identified applications, receiving a response from a user to the set of privacy-related questions, determining one or more classified privacy instances for the user from the received response, and establishing a latent, implicit privacy policy from the one or more classified privacy instances.

The computer program product, in a further aspect, is configured for receiving a new privacy instance for classification. The latent, implicit privacy policy is established using a machine learning classification procedure. A K-star clustering-based classification is performed by defining a metric space such that the new privacy instance is projected into the metric space. A calculation is performed to determine a proximity of the new privacy instance to each of the one or more classified privacy instances for the user. The new privacy instance is classified as one of legitimate or illegitimate, based on the proximity of the new privacy instance to each of the one or more classified privacy instances. The proximity calculation may be performed using a natural distance metric. The natural distance metric may consider any of a data category related to the new privacy instance, or an intensity level of the new privacy instance with respect to a normalized average intensity level of data that the user is willing to release based upon the received response.

An apparatus for configuring a privacy policy, in another aspect, may comprise a processor and a memory coupled to the processor, wherein the memory comprises instructions which, when executed by the processor, cause the processor to identify one or more applications that are installed on a mobile device, formulate a set of privacy-related questions based upon the one or more identified applications, receive a response from a user to the set of privacy-related questions, determine one or more classified privacy instances for the user from the received response, and establish a latent, implicit privacy policy from the one or more classified privacy instances.

The apparatus for configuring a privacy policy, in a further aspect, may include instructions for receiving a new privacy instance for classification. The latent, implicit privacy policy is established using a machine learning classification procedure. A k-star clustering-based classification is performed by defining a metric space such that the new privacy instance is projected into the metric space. A calculation is performed to determine a proximity of the new privacy instance to each of the one or more classified privacy instances for the user. The new privacy instance is classified as one of legitimate or illegitimate, based on the proximity of the new privacy instance to each of the one or more classified privacy instances. The proximity calculation may be performed using a natural distance metric. The natural distance metric may consider any of a data category related to the new privacy instance, or an intensity level of the new privacy instance with respect to a normalized average intensity level of data that the user is willing to release based upon the received response.

BRIEF DESCRIPTION OF THE SEVERAL VIEWS OF THE DRAWINGS

The foregoing aspects and other features are explained in the following description, taken in connection with the accompanying drawings, wherein.

DETAILED DESCRIPTION

Figure 2A:
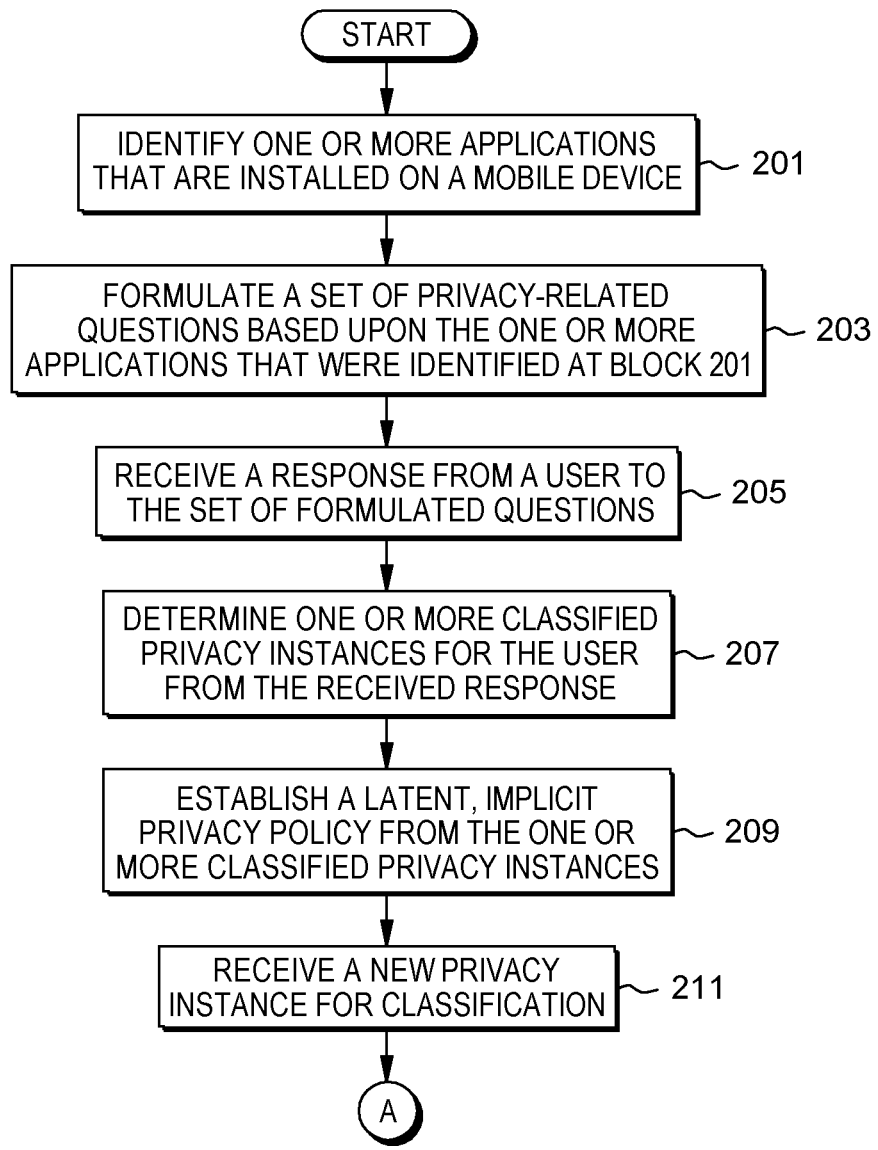
FIGS. 2A and 2B together comprise a flowchart illustrating an exemplary method for configuring a privacy policy, in accordance with one set of embodiments of the present disclosure.
Figure 2B:
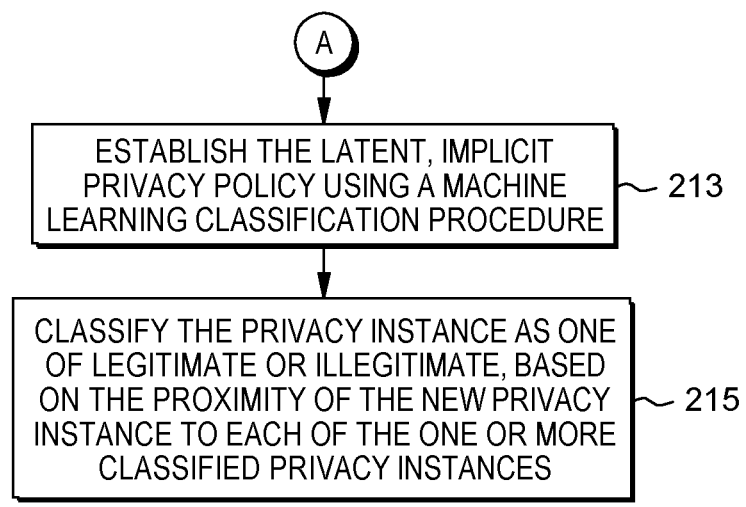

FIGS. 2A and 2B together comprise a flowchart illustrating an exemplary method for configuring a privacy policy in accordance with one set of embodiments of the present disclosure. The procedure commences at block 201 (FIG. 2A) where one or more applications that are installed on a mobile device are identified. As a practical matter, it is extremely unlikely that a mobile device would be completely devoid of applications. Most mobile devices are furnished with an operating system such as Android™ or iOS™, along with a built-in Internet browser, a camera application, a music player, a video player, a contacts list, an application store for acquiring custom applications, an email application, a YouTube™ application, and Google+™.

The operational sequence progresses to block 203 where a set of privacy-related questions is formulated based upon the one or more applications that were identified at block 201. These questions may be based on a pre-compiled database of information for various popular applications. The particular selection of questions may be based upon a particular subset of the popular applications that are installed on a given user's device. Some illustrative examples of privacy-related questions are as follows: Would you like to enable one or more social features in application xxx? How important is it that application yyy has access to your location? Do you view ads presented by application zzz? How often do you use Feature F in application bbb?

Next, at block 205, a response is received from a user to the set of formulated questions. The response may include answers to one or more questions of the set of formulated questions. Thus, the response constitutes one or more specific, concrete instances of the user's privacy preferences. Accordingly, the received response is used to determine one or more classified privacy instances for the user (block 207). The one or more classified privacy instances are then used to establish a latent, implicit privacy policy (block 209). The latent, implicit privacy policy may subsequently be applied to one or more new privacy instances. Alternatively or additionally, the one or more new privacy instances may be used to further refine the latent, implicit privacy policy. The privacy policy is left latent, or implicit, without requiring the user to specify the policy explicitly. The implicit nature of the privacy policy provides a desired level of fuzziness, and also enhances usability and user-friendliness.

The operational sequence progresses to block 211 where a new privacy instance is received for classification. At block 213, the latent, implicit privacy policy is established using a machine learning classification procedure. This classification procedure may determine a proximity of the new privacy instance to each of the one or more classified privacy instances for the user. The proximity calculation may be performed using a natural distance metric. The natural distance metric may consider any of a data category related to the new privacy instance, or an intensity level of the new privacy instance with respect to a normalized average intensity level of data that the user is willing to release based upon the received response.

For purposes of illustration, the machine learning classification procedure of block 213 may be provided in the form of a K-star (K*), clustering-based classification method. K* is a computer-executed algorithm that provides a simple, instance based classifier. K* clustering is performed by defining a metric space such that the new privacy instance is projected into the metric space. The K* algorithm can be defined as a method of cluster analysis which performs a partition of n observations into k clusters. Each of the n observations belongs to a cluster of the k clusters in the metric space having a mean that is closest to this observation. In essence, the K* algorithm is an instance-based machine learner which uses entropy as a distance measure.

The K* algorithm operates by assigning new data instances, x, to a class that occurs most frequently amongst the k-nearest data points, denoted as $y_j$, where j=1, 2 . . . k. Entropic distance is then used to retrieve the most similar instances of $y_j$ from the data set. Entropic distance as a metric has a number of benefits including handling of real-valued attributes, symbolic attributes, and missing values. The K* function can be calculated as: $K^*(y_i,x)=-\ln P^*(y_i,x)$, where P* is the probability of all transformational paths from instance x to y. It can be useful to understand the K* function as the probability that x will arrive at y via a random walk in the metric space.

The operational sequence progresses from block 213 to block 215 where the new privacy instance is then classified as one of legitimate or illegitimate, based on the proximity of the new privacy instance to each of the one or more classified privacy instances. Legitimate refers to information which is predicted as being willing to be released by the user based upon the received response. Likewise, illegitimate refers to information which is predicted as not being willing to be released by the user based upon the received response.

Figure 3:
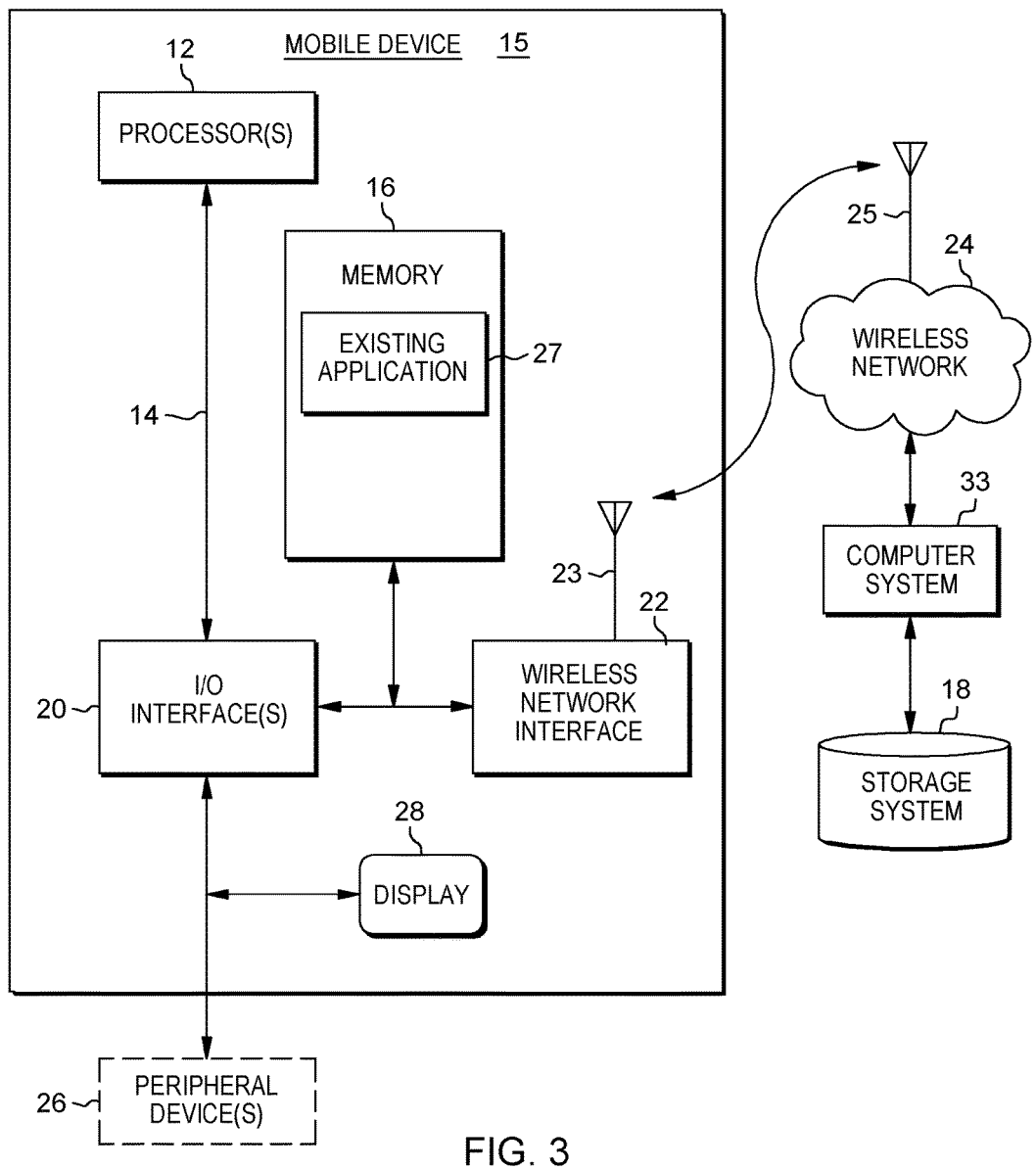
FIG. 3 is a block diagram illustrating an exemplary hardware configuration for performing the method of FIGS. 2A and 2B, in accordance with one set of embodiments of the present disclosure.

FIG. 3 is a block diagram illustrating an exemplary hardware configuration for performing the method of FIGS. 2A and 2B, in one set of embodiments of the present disclosure. The configuration includes a computer system 33 operatively coupled to a mobile device 15 over a wireless network 24. Illustratively, the computer system 33 may perform the application identifying procedure of block 201, the question formulating procedure of block 203, the response receiving procedure of block 205, the determining of classified privacy instances at block 207, the establishment of a latent privacy policy at block 209, the receiving of a new privacy instance at block 211, the establishing of a latent privacy policy for the new privacy instance at block 213, and the classifying of the new privacy instance as legitimate or illegitimate at block 215. However, pursuant to a set of alternate embodiments, one or more of the foregoing procedures may be performed by the mobile device 15, or by a combination of the mobile device 15 and the computer system 33.

Some illustrative examples of the mobile device 15 include a smartphone, a tablet computer, a cellphone, a personal digital assistant (PDA), a portable communications device, or a navigation system. The mobile device 15 is only one example of a suitable processing system and is not intended to suggest any limitation as to the scope of use or functionality of embodiments of the methodology described herein.

The mobile device 15 includes one or more processors 12 operatively coupled to a computer-readable memory 16. The memory 16 can include computer system readable media in the form of volatile memory, or non-volatile memory, or any of various combinations thereof. Some illustrative examples of volatile memory include random access memory (RAM) and/or cache memory, or other types of memory devices, or any of various combinations thereof. Some illustrative examples of non-volatile memory include read-only memory (ROM), magnetic media such as a "hard drive", a solid-state storage drive, or an optical disk drive. The memory 16 includes an operating system (OS) that is executed by the one or more processors 12. Illustrative examples of operating systems include Android™ and Apple iOS™. The one or more processors 12 are configured to execute various types of software applications, sometimes referred to as apps.

Figure 1:
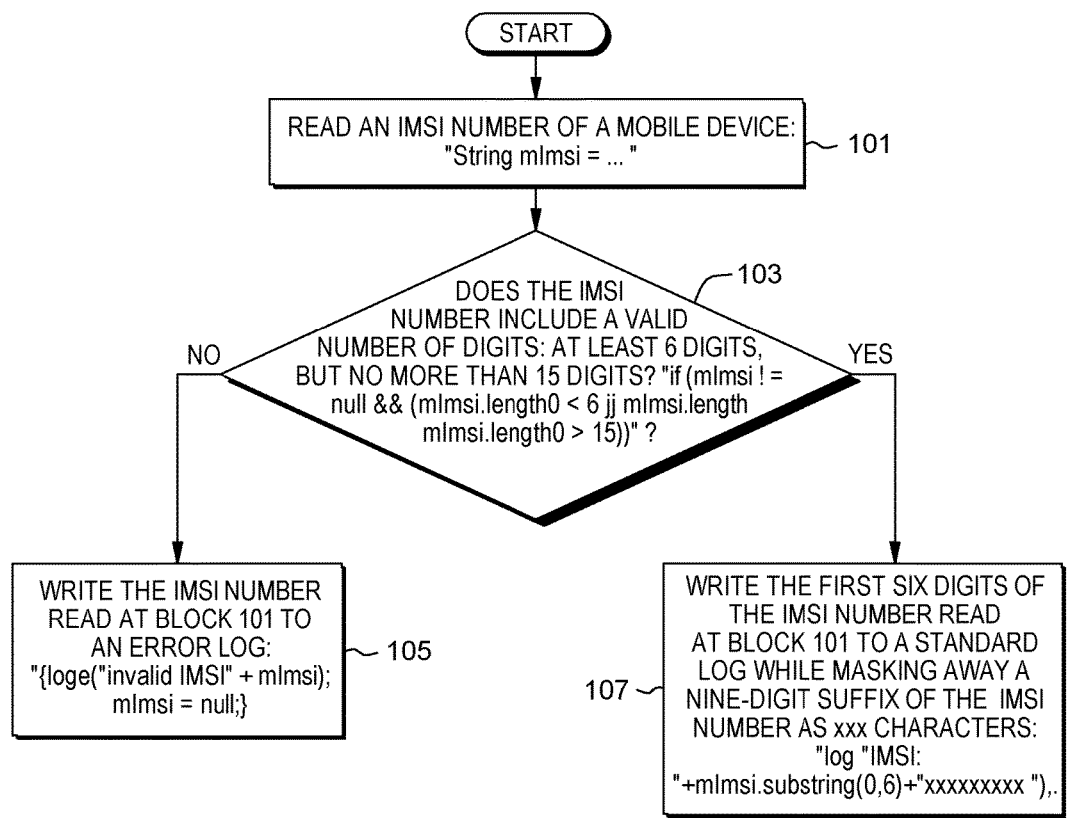
FIG. 1 is a flowchart setting forth an illustrative code fragment from an internal Android™ library.

The one or more processors 12 may be described in the general context of computer system executable instructions, such as program modules, being executed by a computer system. Generally, program modules may include routines, programs, objects, components, logic, data structures, and so on that perform particular tasks or implement particular abstract data types. Thus, the one or more processors 12 may include a module that performs the methods described herein with reference to FIGS. 1A and 1B. The module may be programmed into the integrated circuits of the one or more processors 12, or loaded from the memory 16, or the wireless network 24, or any of various combinations thereof.

The mobile device 15 may be operational with numerous other general purpose or special purpose computing system environments or configurations. Thus, the mobile device 15 includes a wireless network interface 22 coupled to a first antenna 23. The wireless network interface 22 and the first antenna 23 are configured for communicating with the wireless network 24. The wireless network 24 is operatively coupled to a second antenna 25 and to the computer system 33.

Illustratively, the wireless network interface 22 is configured for implementing wireless communication using a wireless standard such as Global System for Mobile Communications (GSM), Universal Mobile Telecommunications System (UMTS), Code Division Multiple Access (CDMA), Long-Term Evolution (LTE), 2G, 3G, 4G, 5G, Near Field Communications (NFC), WiFi, WiMAX, or Bluetooth. In general, these wireless standards are configured for efficiently dividing the finite RF spectrum among multiple users. For example, GSM uses time-division multiple access (TDMA) and frequency-division multiple access (FDMA) to provide separation among users and cells. UMTS and CDMA-2000 use code-division multiple access (CDMA). WiMAX and LTE use orthogonal frequency division multiplexing (OFDM). Illustratively, the mobile device 15 uses one or more of the foregoing wireless standards to access the Internet through the wireless network 24.

TDMA provides mobile device 15 access to the wireless network 24 by chopping up a physical RF communications channel occupying a given frequency bandwidth into sequential time slices. Each user of the channel takes turns to transmit and receive signals. In reality, only one mobile device 15 is actually using the channel at any specific moment in time. This is analogous to time-sharing on a large computer server. FDMA provides multi user access by separating the frequencies used by each of a plurality of mobile devices such as the mobile device 15. In GSM, the FDMA approach is used to separate each of a plurality of cells of the wireless network 24, and then TDMA is used to separate each of a plurality of mobile device 15 users within the cell.

CDMA uses spread-spectrum digital modulation to spread voice data over a very wide channel in pseudorandom fashion using a mobile device 15-specific or cell-specific pseudorandom code. A receiver at the wireless network 24 undoes the randomization to collect the bits together and produce the original voice data. As the codes are pseudorandom and selected in such a way as to cause minimal interference to one another, multiple users can talk at the same time and multiple cells can share the same frequency. This causes an added signal noise forcing all users to use more power, which in exchange decreases cell range and battery life.

Orthogonal Frequency Division Multiple Access (OFDMA) uses bundling of multiple small frequency bands that are orthogonal to one another to provide for separation of mobile device 15 users. The users are multiplexed in the frequency domain by allocating specific sub-bands to individual users. This is often enhanced by also performing TDMA and changing the allocation periodically so that different users are assigned different sub-bands at different times. The foregoing wireless standards are provided solely for purposes of illustration, as the mobile device 15 may be configured for communicating with the wireless network 24 using any communications standard.

The mobile device 15 includes an input/output (I/O) interface 20. The I/O interface is used to interface the one or more processors 12 to the wireless network interface 22, a display 28, and one or more optional peripheral devices 26 such as a keyboard, a pointing device, or one or more devices that enable a user to interact with the mobile device 15. The display 28 may be provided in the form of a touch-sensitive screen and/or a miniature keyboard. The touch-sensitive screen may be configured to accept a tactile input or a stylus input, or both. The optional peripheral devices 26 may also include any device, such as a network card or a modem, that enables the mobile device 15 to communicate with one or more other computing devices. Such communication can occur via the I/O interface 20.

The computer system 33 may include a variety of computer system readable media. Such media may be any available media that is accessible by computer system, and it may include both volatile and non-volatile media, removable and non-removable media. In the example of FIG. 2, the computer system 33 is configured for accessing a storage system 18 on which at least one new application 29 is stored. The computer system 33 may be described in the general context of computer system executable instructions, such as program modules, being executed by a computer system. Generally, program modules may include routines, programs, objects, components, logic, data structures, and so on that perform particular tasks or implement particular abstract data types. Examples of well-known computing systems, environments, and/or configurations that may be suitable for implementing the computer system 33 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 33 may be practiced in distributed cloud computing environments where tasks are performed by remote processing devices that are linked through a communications network such as the wireless network 24. In a distributed cloud computing environment, program modules may be located in both local and remote computer system storage media including memory storage devices such as the storage system 18.

The computer system 33 may further include other removable/non-removable, volatile/non-volatile computer system storage media. By way of example only, the storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided.

Both the mobile device 15 and the computer system 33 can communicate with one or more networks, such as the wireless network 24, a local area network (LAN), a general wide area network (WAN), and/or a public network (e.g., the Internet). It should be understood that although not shown, other hardware and/or software components could be used in conjunction with the computer system 33. Examples include, but are not limited to: microcode, device drivers, redundant processing units, external disk drive arrays, RAID systems, tape drives, and data archival storage systems, etc.

The mobile device 15 may be equipped with a source of battery power. Optionally, the mobile device 15 may also be equipped with a Global Positioning System (GPS) receiver for utilizing one or more location-based services. Other optional features of the mobile device 15 may include a camera, a media player for playing back video or music files, or one or more sensors. Such sensors may include an accelerometer, a compass, a magnetometer, or a gyroscope, allowing detection of orientation of motion. Optionally, the mobile device 15 may provide biometric user authentication, such as using a built-in camera for facial recognition or using a fingerprint sensor for fingerprint recognition.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for configuring a privacy policy, the method comprising:
   identifying one or more applications that are installed on a user's mobile device;
   formulating a set of privacy-related questions based upon the one or more identified applications;
   receiving a response from the user to the set of privacy-related questions;
   determining one or more classified privacy instances for the user from the received response; and
   establishing a latent, implicit privacy policy from the one or more classified privacy instances using a machine learning classification procedure;
   receiving a new privacy instance for classification; and
   performing a calculation to determine a proximity of a new privacy instance to each of the one or more classified privacy instances for the user, the calculation being performed using a natural distance metric that considers an intensity level of the new privacy instance with respect to a normalized average intensity level of data that the user is willing to release based upon the received response.

2. The method of claim 1 wherein the machine learning classification procedure comprises a K-star clustering-based classification method.

3. The method of claim 2 wherein the K-star clustering-based classification method is performed by defining a metric space such that the new privacy instance is projected into the metric space.

4. The method of claim 1 further comprising classifying the new privacy instance as one of legitimate or illegitimate, based on the proximity of the new privacy instance to each of the one or more classified privacy instances.

5. The method of claim 1 wherein the calculation is performed using a natural distance metric that considers a data category related to the new privacy instance.

6. A computer program product comprising a non-transient computer-readable storage medium having a computer-readable program stored therein, wherein the computer-readable program, when executed, causes a computer to perform a method for configuring a privacy policy, the method comprising:
   identifying one or more applications that are installed on a user's mobile device;
   formulating a set of privacy-related questions based upon the one or more identified applications;
   receiving a response from the user to the set of privacy-related questions;
   determining one or more classified privacy instances for the user from the received response; and
   establishing a latent, implicit privacy policy from the one or more classified privacy instances using a machine learning classification procedure;
   receiving a new privacy instance for classification; and
   performing a calculation to determine a proximity of a new privacy instance to each of the one or more classified privacy instances for the user, the calculation being performed using a natural distance metric that considers an intensity level of the new privacy instance with respect to a normalized average intensity level of data that the user is willing to release based upon the received response.

7. The computer program product of claim 6 wherein the machine learning classification procedure comprises a K-star clustering-based classification method.

8. The computer program product of claim 7 further configured for performing the K-star clustering-based classification method by defining a metric space such that the new privacy instance is projected into the metric space.

9. The computer program product of claim 6 further configured for classifying the new privacy instance as one of legitimate or illegitimate, based on the proximity of the new privacy instance to each of the one or more classified privacy instances.

10. The computer program product of claim 6 further configured for performing the calculation using a natural distance metric that considers a data category related to the new privacy instance.

11. An apparatus for configuring a privacy policy, the apparatus comprising a processor and a memory coupled to the processor, wherein the memory comprises instructions which, when executed by the processor, cause the processor to:
   identify one or more applications that are installed on a user's mobile device;

formulate a set of privacy-related questions based upon the one or more identified applications;
receive a response from the user to the set of privacy-related questions;
determine one or more classified privacy instances for the user from the received response; and
establish a latent, implicit privacy policy from the one or more classified privacy instances using a machine learning classification procedure;
receive a new privacy instance for classification; and
perform a calculation to determine a proximity of a new privacy instance to each of the one or more classified privacy instances for the user, the calculation being performed using a natural distance metric that considers an intensity level of the new privacy instance with respect to a normalized average intensity level of data that the user is willing to release based upon the received response.

12. The apparatus of claim 11 wherein the machine learning classification procedure comprises a K-star clustering-based classification method for defining a metric space such that the new privacy instance is projected into the metric space.

\* \* \* \* \*